M. A. KELLER.
Straw Carrier.
No. 106,370. Patented Aug. 16, 1870.
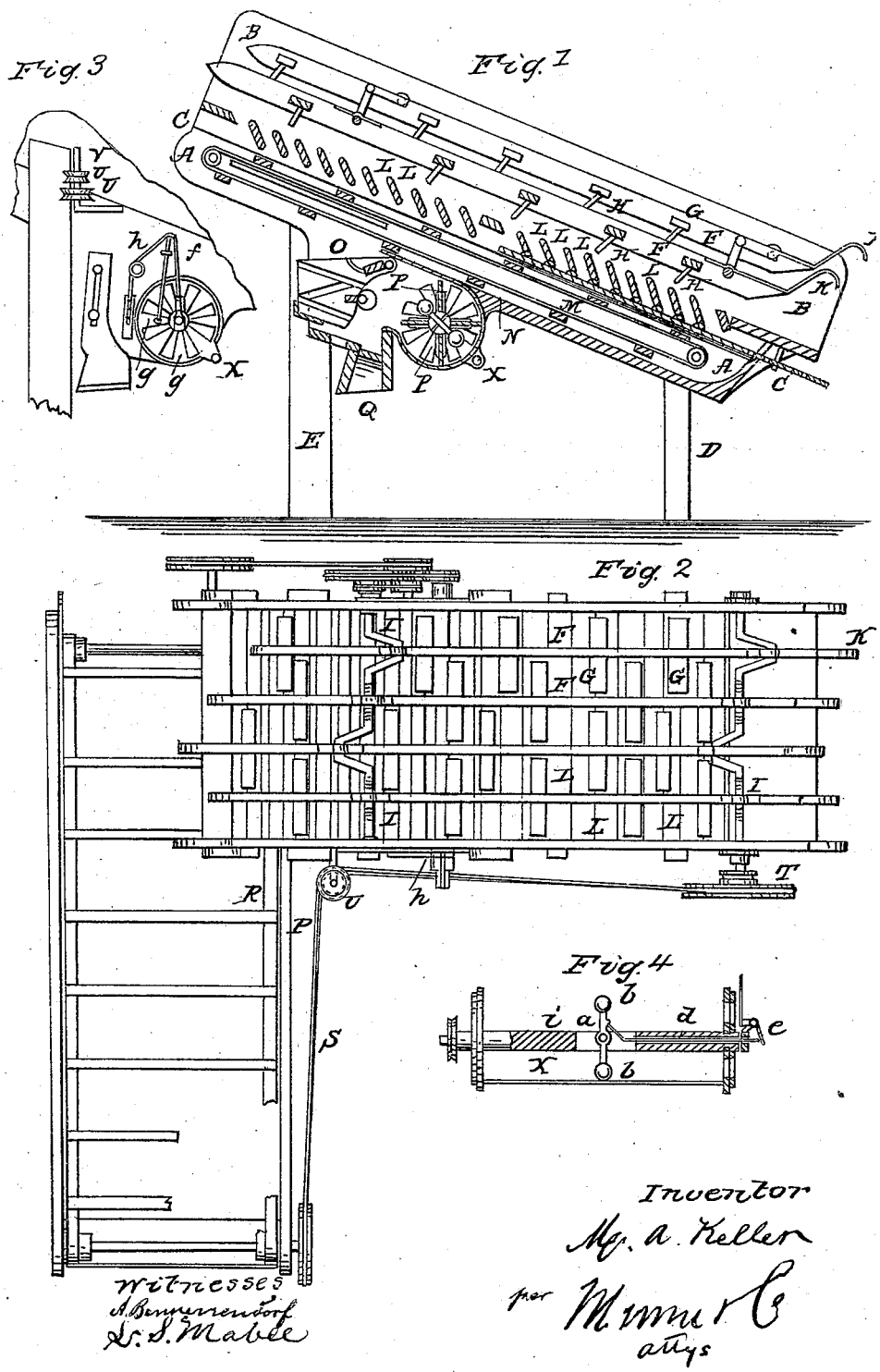

UNITED STATES PATENT OFFICE.

MOSES A. KELLER, OF LITTLESTOWN, PENNSYLVANIA.

IMPROVEMENT IN SEPARATOR ATTACHMENTS TO THRASHING-MACHINES.

Specification forming part of Letters Patent No. 106,370, dated August 16, 1870.

*To all whom it may concern:*

Be it known that I, MOSES A. KELLER, of Littlestown, in the county of Adams and State of Pennsylvania, have invented a new and Improved Separator Attachment for Thrashing-Machines; and I do hereby declare that the following is a full, clear, and exact description thereof, which will enable others skilled in the art to make and use the same, reference being had to the accompanying drawing, forming a part of this specification.

My invention relates to straw and grain separators; and consists, first, in combining adjustable slats with the straw-separating bars; second, in a weighted pivot-bar attached to a slotted fan-shaft; third, in a peculiar arrangement of vertically-sliding guide-pulleys with respect to the straw-carrier and belt.

Figure 1 is a sectional elevation of my improved machine. Fig. 2 is a plan view. Fig. 3 is a partial side elevation, and Fig. 4 is a section of the fan-shaft and the air-regulating apparatus.

Similar letters of reference indicate corresponding parts.

A and B represent an inclined case for the straw-carrying and separating apparatus, and the endless carrier, made in two parts, connected together on the line C, so as to be readily separated. This case is arranged on short posts D at one end, and long arms E at the other.

F represents the long bars of the straw-carrier; G, the short transverse bar, and H the fingers. These bars are mounted on the crank-shafts I, which are turned in the direction to bring the bars down on the straw at the time they move upward in the case, and to move them back when they are raised, so as to be disengaged from the straw. The lower ends of the bars are provided with hooks K, which take the straw as it is delivered from the thrashing-machine.

Below these carriers are slats L, traversing the case, and arranged on pivots, to be turned for opening or closing the spaces, to regulate the separation of the grain-chaff and other short matter from the straw which is carried upward above these slats. The straw is delivered over the upper end of the case.

M is an endless carrier, with cross-bars, which carries the grain and chaff up the inclined bottom N of case to the shaker O of the winnower, of which P represents the fan, and Q the discharge-spout.

R is another endless straw-carrier, supported on a frame, P, arranged for attachment, by means of hooks or otherwise, to the parts E, so as to receive the straw from the first carrier and convey it in a direction perpendicular thereto to a stack or mow. This carrier is worked by a belt, S, from the driving-wheel T of one of the crank-shafts of the first carrier, the said belt passing around pulley U, supported on a stud, V, in the angle between the case of the first carrier and this one, so as to rise or fall on the said stud, as may be required by the variations of the height of the end of the carrier R, to which the belt is connected.

The blast-regulator for the winnowers consists of a bar, $a$, pivoted at the center in a slot through the fan-shaft, and provided with weights $b$ at the ends, which, by the centrifugal force they acquire by rotation, cause the bar to assume a line perpendicular to the shaft. This bar is connected by a rod, $d$, in the hollow fan-shaft to a bell-crank, $e$, mounted at the outer end of the fan-shaft, and connected by a bent rod, $f$, with a register, $g$, fitted to the fan-shaft to turn thereon. A spring, $h$, is connected to this rod $f$, and arranged to cause it to hold the register open; also, to hold the bar $a$ in an oblique position, through the medium of the crank $e$ and the rod $d$, so that when in motion the tendency of the bar to assume a line perpendicular to the shaft $i$ of the fan will counteract the spring and move the register when the fan runs too fast, thereby reducing the force of the blast.

The registers for each end of the fan-case are connected together by a bar, X, so that both will be worked by the one regulating apparatus.

Having thus described my invention, what I claim as new, and desire to secure by Letters Patent, is—

1. The combination, with the straw-separating bars F G and pins I, of the adjustable slats L, substantially as specified.

2. The arrangement of pivoted bar $a$ and weights $b$, with respect to the slotted fan-shaft, as and for the purpose specified.

3. The arrangement, with respect to the straw-carrier R and belt S, of guide-pulleys U, sliding vertically, as and for the purpose specified.

MOSES A. KELLER.

Witnesses:
WILLIAM RIDER,
MARTIN STEPPY.